May 10, 1966 J. E. BONTHUIS ETAL 3,250,375
TIMING CONVEYOR

Filed Sept. 20, 1963

INVENTORS
JAMES E. BONTHUIS
WALTER B. PIPP
BY DELBERT L. RECTOR

ATTORNEYS

INVENTORS
JAMES E. BONTHUIS
WALTER B. PIPP
BY DELBERT L. RECTOR

ATTORNEYS

May 10, 1966  J. E. BONTHUIS ETAL  3,250,375
TIMING CONVEYOR

Filed Sept. 20, 1963  7 Sheets-Sheet 3

INVENTORS
JAMES E. BONTHUIS
WALTER B. PIPP
BY DELBERT L. RECTOR

Price & Heneveld
ATTORNEYS

INVENTORS
JAMES E. BONTHUIS
WALTER B. PIPP
BY DELBERT L. RECTOR

Price & Heneveld
ATTORNEYS

May 10, 1966   J. E. BONTHUIS ETAL   3,250,375
TIMING CONVEYOR
Filed Sept. 20, 1963   7 Sheets-Sheet 5

INVENTORS
JAMES E. BONTHUIS
WALTER B. PIPP
BY DELBERT L. RECTOR

ATTORNEYS

INVENTORS
JAMES E. BONTHUIS
WALTER B. PIPP
DELBERT L. RECTOR
BY Price & Heneveld
ATTORNEYS United States Patent Office 3,250,375
Patented May 10, 1966

3,250,375
TIMING CONVEYOR
James E. Bonthuis and Walter B. Pipp, Grand Rapids, and Delbert L. Rector, Belmont, Mich., assignors to The Rapids-Standard Company, Inc., Grand Rapids, Mich., a corporation of Michigan
Filed Sept. 20, 1963, Ser. No. 310,353
4 Claims. (Cl. 198—34)

This invention relates to warehousing conveyor equipment and more particularly to conveyor apparatus for singulating, spacing and orienting articles, especially cartons, of varied sizes, for association with a carton analyzer and routing controller.

Presently, the filling of orders in a warehouse of articles such as shoe cartons, containing thousands of different styles and sizes of shoes, and ordered in entirely different combinations by retailers, necessitates a large manpower force to separately pick the individual items of each order, compile them, and transport them to a common loading area. Many orders are so tremendously large, involving thousands of different items, that several men must simultaneously circulate through the warehousing system and collect cartons. Often a particular worker must move a substantial distance through the warehouse for only one or a small number of items, thereby using time and effort inefficiently. Available systems do not enable the order pickers to work on several orders at a time since the items of the orders would be hopelessly mixed. The cartons of the several orders would be in haphazard order, necessitating a complete resorting of the items at the discharge end of the conveyor. This is so because presently there is no known conveyor apparatus capable of continuously, rapidly, automatically, and controllably spacing and positioning varied sizes of shoe boxes for carton discrimination and distribution on a selective basis.

It is therefore an object of this invention to provide conveyor apparatus having the capacity to automatically singulate and space a plurality of bunched dissimilar cartons into an exact orderly array longitudinally and laterally on the conveyor. The cartons are controlled with sufficient exactness to enable a data card attached to one end of the carton to reliably interengage with a card analyzing and carton discriminating and discharge control apparatus to route the cartons on a predetermined distance basis.

It is another object of this invention to provide a singulating, spacing, and orientation conveyor for dissimilar cartons enabling the cartons to be reliably discharged on a selective individual basis on the discharge end of the conveyor according to the individual orders.

It is another object of this invention to provide a carton sorting apparatus enabling cartons of several orders to be simultaneously picked and placed on the conveyor in mixed order, while providing discharge of the cartons in a selective orderly basis into individual order areas. The sorting mechanism is moreover rapid and continuous, handling varying sizes of cartons in regulated, dependable manner at a high rate of flow.

It is another object of this invention to provide a handling conveyor for cartons enabling the cartons to be discharged on a distance controlled basis for movement into individual areas, with each carton discharge being controlled by an analyzing controller actuated in accordance to the signals on a control card on each carton.

It is another object of this invention to provide continuous conveyor apparatus receiving batches of varied size cartons of several orders, spacing and singulating the cartons, positioning them at exact spacings for association with a carton control means, and discharged on a distance basis into special sorting bays.

These and several other objects of this invention will become apparent upon studying the following specification in conjunction with the drawings in which.

Figures 1, 2, 3:
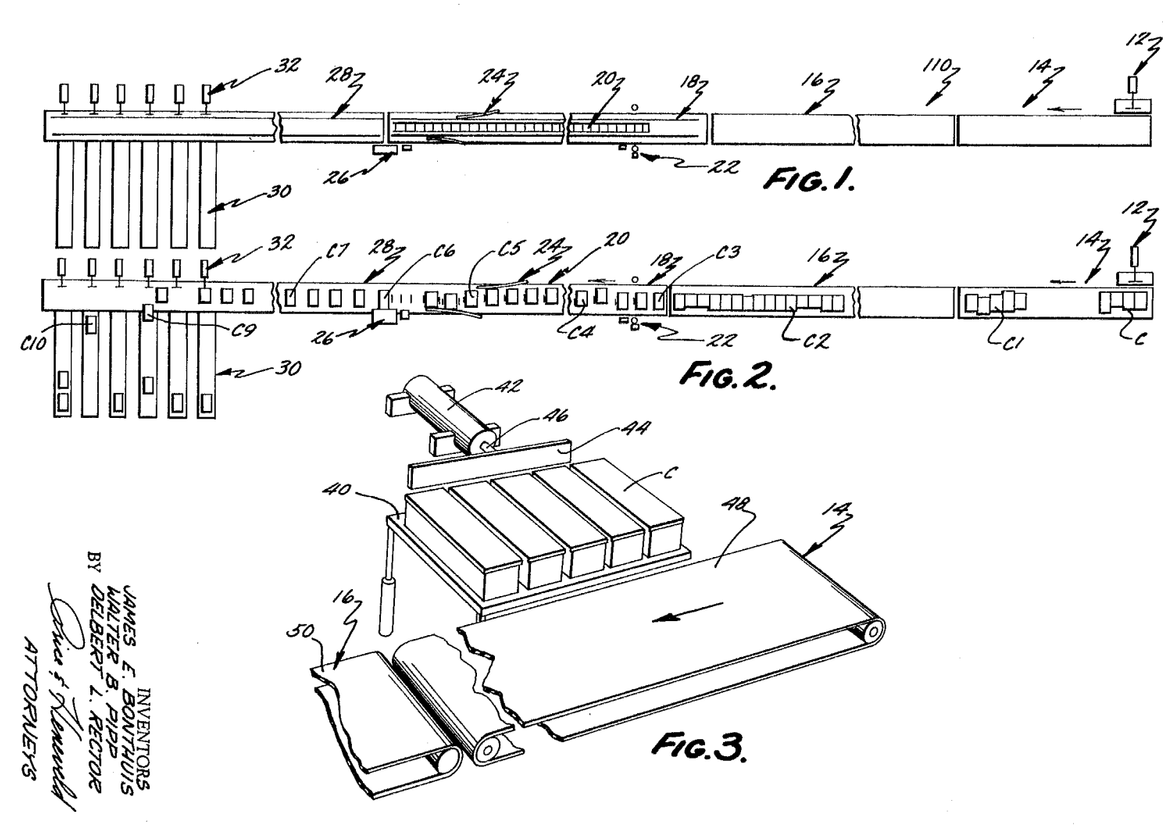
FIG. 1 is a plan schematic view of the complete carton conveying, singulating, spacing, orienting, analyzing and sorting apparatus.
FIG. 2 is a plan schematic view of the apparatus illustrated in FIG. 1 with exemplary cartons positioned thereon.
FIG. 3 is an enlarged fragmentary view of a batch conveyor loader for the apparatus, and of the juncture between the rapid feed conveyor and a retention feed conveyor.

Referring now specifically to FIG. 1, the complete apparatus 10 there illustrated includes a batch-type conveyor loader 12, a rapid feed conveyor 14, a low speed temporary retention conveyor 16, a high speed singulating conveyor 18, a spacing flight conveyor 20, a flight conveyor setup mechanism 22, lateral carton positioning guides 24, a carton card analyzer and controller 26, a timing conveyor 28, a plurality of discharge bay conveyors 30, and a plurality of discharge devices 32 adjacent the respective bays and individually controlled by controller 26 in accordance with movement of the timing conveyor 28.

Referring to FIG. 2, a brief introductory description of the operational sequence comprises: loading of cartons C by the batch conveyor loader 12 onto the rapid feed conveyor 14, high speed removal of these cartons at C1 to the slow speed temporary storage conveyor 16 to the more or less bunched position at C2, singulating of the cartons at C3 by high speed conveyor 18, erection of the individual flights 21 on flight conveyor 20 for cartons at C4 by mechanism 22, lateral positioning of the cartons at C5 by the lateral flanged guides 24, analyzing of the cartons at C6 by the analyzer and controller 26, synchronized conveying of the analyzed cartons at C7 by the timing discharge conveyor 28, and discharge of the cartons C9 and C10 by the discharge devices 32 at predetermined ones of bays 30 in selective fashion.

During one normal use of the novel apparatus, it is employed to convey, singulate, sort and discharge shoe cartons containing hundreds of different styles, sizes and types of shoes. It can be employed to advantage for other articles, but will be explained in this connection for purposes of convenience.

In a shoe warehousing system, shoe order pickers move around in the warehouse with order slips, manually pick individual cartons from several different orders simultaneously, and place them on suitable elevating and/or conveying means which may use pallets 40 (FIG. 3). The pallets are moved by conveying and/or elevating means to the position adjacent air cylinder pusher 42 having a pusher plate 44 operably connected to its extensible shaft 46. Actuation of the cylinder by air pressure transfers the cartons onto continuous conveyor belt 48 of the feed conveyor 14. This conveyor is powered by suitable motor means (not shown) and preferably moves at a relatively high speed to shift the cartons rapidly out of position in front of loader 42 to enable the next pallet to be unloaded immediately thereafter. Thus, a great number of pallets can be unloaded in rapid succession.

Figure 4:
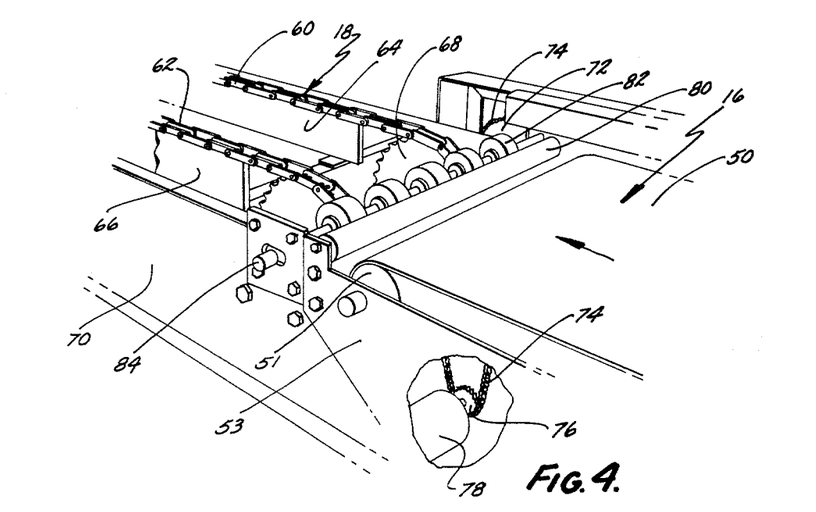
FIG. 4 is a fragmentary enlarged perspective view of the juncture between the retention conveyor and a high speed singulating conveyor.

This high speed feed conveyor transfers the cartons onto the continuous belt 50 of the slower moving temporary storage conveyor 16. It travels around conventional rollers 51 suspended on a frame 53. The conveyor 16 unloads the cartons one at a time on the leading edge of the high speed singulating conveyor 18 (FIG. 4).

This high speed conveyor includes a pair of roller chains 60 and 62 supported during their upper pass on elongated guide plate tracks 64 and 66. The chains each have a sprocket on each end of its track. Sprockets 68 are shown on the forward end (FIG. 4), with like sprockets being on the other end. The sprockets on either end may be driven. The sprockets 68 are supported on shafts mounted between the pair of channel beams 70 forming the side rails. In this instance, sprockets 68 are shown to be the driving sprockets since their shaft is driven by a sprocket 72 keyed to the extended end of the shaft. Sprocket 72 is in turn driven by a chain 74 from sprocket 76 operated by a suitable electrical motor 78. If the sprockets on the other end are driven, these sprockets 68 are then idlers, of course.

Adjacent the end of belt 50 is a transfer roller 80, and a plurality of transfer wheels 82 mounted on a shaft 84. The cartons are smoothly transferred from belt 50 to the pair of chains 60 and 62. The wheels 82 may be powered from motor 78.

Figure 5:
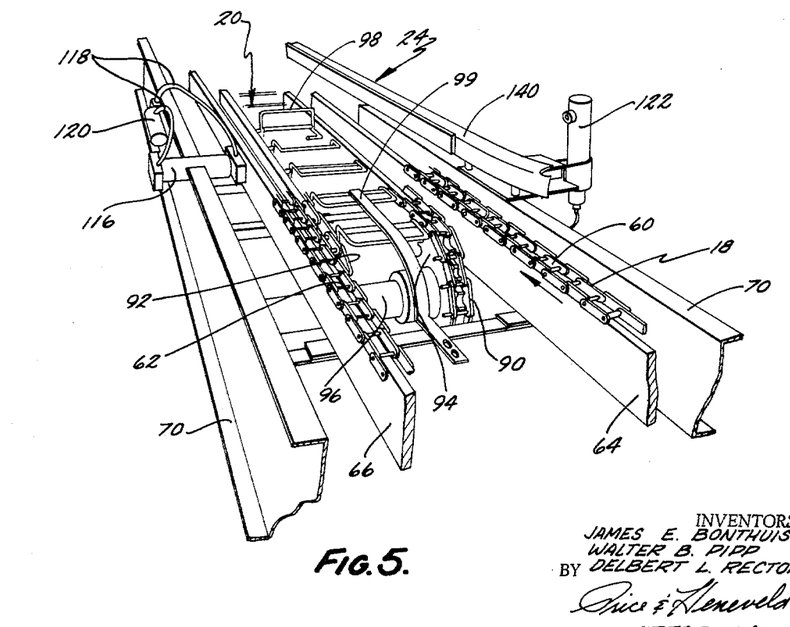
FIG. 5 is a fragmentary enlarged perspective view of the overalapping juncture between the high speed singulating conveyor and the spacing flight conveyor.

Since the chains move at a linear speed much greater than the belt, each of the transferred cartons is individually accelerated to a faster speed, thereby creating a space between the cartons to singulate them. Due to the different weight and sizes of the cartons being transferred, varying amounts of slippage occur between each carton and chains 60 and 62. This can create different spacings between the cartons. The high speed conveyor chains, after a short distance, overlap and straddle a carton spacing flight conveyor 18 (FIG. 5).

Figure 9:
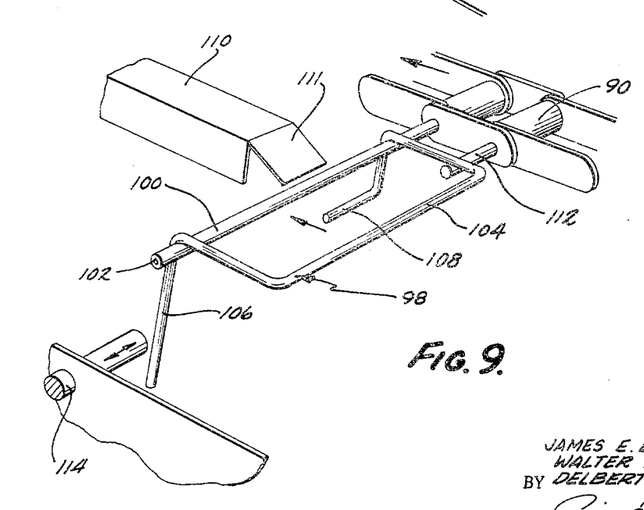
FIG. 9 is an enlarged fragmentary perspective view of a small segment of the flight conveyor, showing an individual flight and the protruding rod of the flight erection device.
Figure 13:
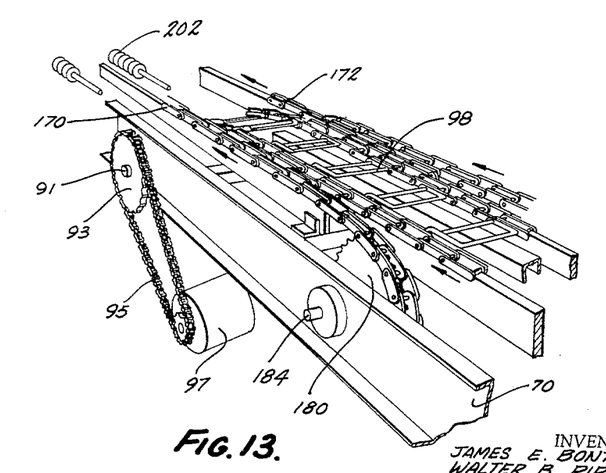
FIG. 13 is an enlarged perspective fragmentary view of the juncture of the flight conveyor and high speed conveyor with the timing discharge conveyor.

This flight conveyor includes a pair of roller chains 90 and 92 moving about sprockets 94 mounted on a transverse shaft 96 supported between side rails 70 on the leading end, and sprockets on the exit end mounted on a rotatable shaft 91 (FIG. 13). The shaft is driven by external sprocket 93, which in turn is rotated by chain 95 from motor 97. A plurality of individual moving flight stops 98 are each pivotally mounted between the chains at spaced intervals. Each of these flights (FIG. 9) include a main pivotal shaft 100 having openings 102 in its ends to receive and fit over the pins extending from the links of chains 90 and 92. Welded to this shaft is a generally U-shaped bar 104, which includes a depending leg 106 transverse to shaft 100 and generally perpendicular to the U-shaped bar 104. Normally, bar frame 104 is generally horizontal in its reclined position. It can be elevated to a vertical position by pivotal movement of shaft 100 about pins extending from chains 90 and 92 to an erected position. On the opposite side of the U, a dogleg 108 depends therefrom, including a first portion parallel to setup leg 106 and a lower portion parallel to shaft 100 and the top surface of angle guide 110. This angle guide extends longitudinally of the conveyor apparatus, substantially the length of the flight conveyor. When a flight is in depressed position (as illustrated in FIG. 9), the frame 104 rests upon an inwardly projecting holding pin 112 from the chain 90.

Each of the flights can be shiftably preconditioned by being elevated as it is being moved by the chains, by contact with the extended shaft 114 of an air cylinder 116 (FIGS. 5 and 9) mounted adjacent the guide track 66. This cylinder, actuated by pressurized air lines 118, is controlled by a solenoid control valve 120. The setup device is actuated only when a carton is moving into relationship thereto, as in FIG. 7. This carton is being conveyed by chains 60 and 62 of the high speed conveyor over the top of the slightly lower chains 90 and 92 of the flight conveyor. At the leading end of the flight conveyor, the high speed conveyor chains are elevated considerably above the flight conveyor chains to be the controlling driving force on the cartons being conveyed to constitute article propulsion means.

Figure 7:
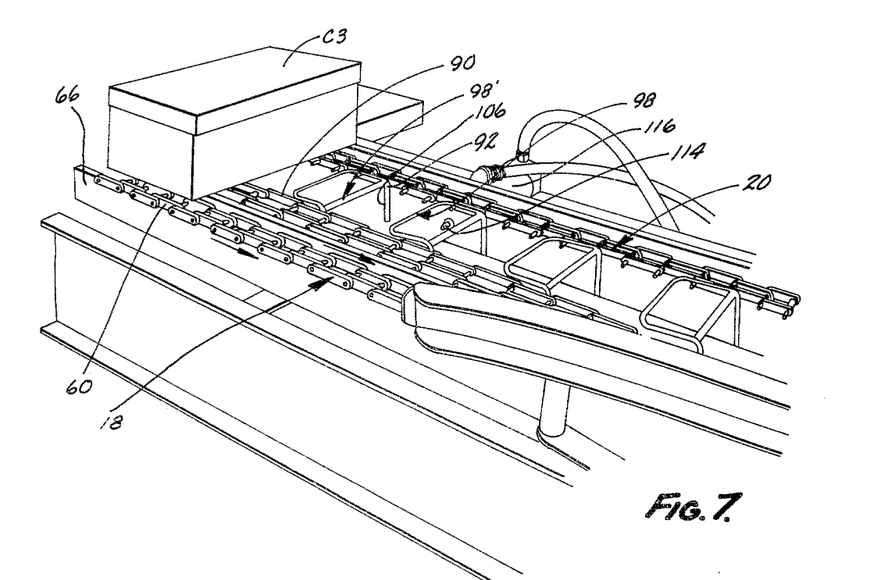
FIG. 7 is a fragmentary enlarged perspective view of the flight conveyor and high speed conveyor in relation to the flight erection mechanism and the front of a shoe carton.

With respect to carton C3 in FIG. 7, the depressed flight 98' immediately in front thereof will be erected by extension of shaft 114 of cylinder 116 into the path of the depending setup leg 106 (FIG. 9) to pivot the frame of the flight upwardly, and cause the dogleg 108 to ride up over the slanted lip 111 and onto the top surface of the angle guide 110. This guide holds the flight in its erected position during movement along the remainder of the flight conveyor.

Figure 6:
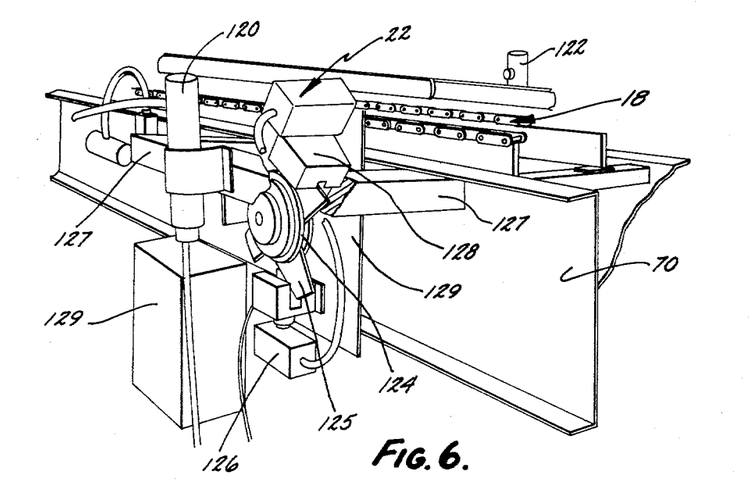
FIG. 6 is a fragmentary perspective enlarged view of the erection control mechanism for the individual flights on the spacing flight conveyor.

The flight protrudes upwardly past the level of the high speed conveyor chains and acts as a carton speed regulator or "stop" since the flight conveyor moves at a substantially slower speed than the high speed conveyor, e.g. 90 feet per minute vs. 130 feet per minute. Rod 114 of air cylinder 116 must be extended and retracted on a controlled interval basis to setup only selected flights for passing cartons. Therefore, a special erection actuator and control is employed. Referring to FIG. 6 (and FIG. 1), adjacent the juncture of the overlapping high speed conveyor 18 and the flight conveyor 20 is a setup control mechanism 22. This control mechaism includes a pair of cooperating electric eye signal response housings 120 and 122, one to emit and one to receive a light beam. These are on opposite sides of the high speed conveyor to respond to the movement of a carton therebetween. The electric eye sensor is electrically and mechanically coordinated with the actuation of the two vane-operated limit switches 126 and 128. This switching mechanism includes a rotary hub 124 having a plurality, here four, of radially protruding vanes 125 of magnetic material. These pass intermittently through the two magnetic fields of the pair of limit switches 126 and 128. It is mounted, with its control elements, to a support panel 129 affixed within a U-shaped bracket 127 having its ends mounted to conveyor side rail 70. This bracket is shown partially broken away in FIG. 6 to show the vane switch.

Figure 16:
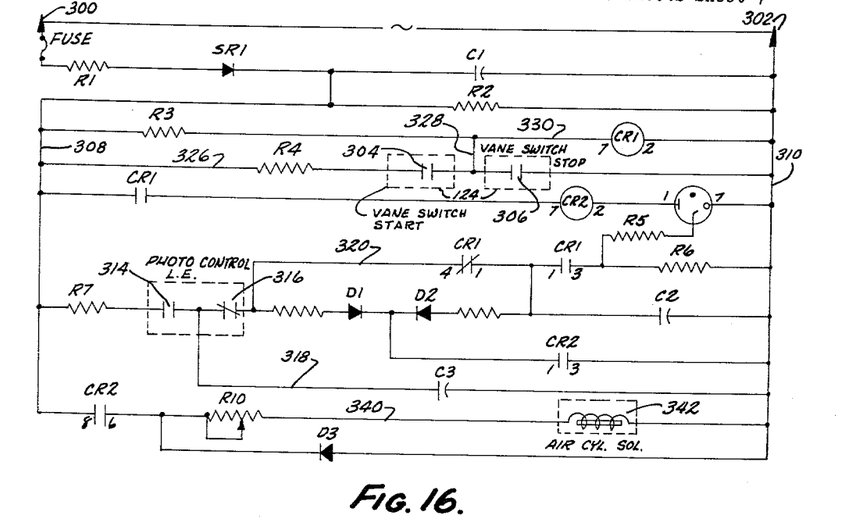
FIG. 16 is a circuit diagram of the flight erection control apparatus illustrated in FIG. 6.

The timing of the flight erection mechanism is extremely delicate. The cartons move rapidly past the setup mechanism so that the erection mechanism must be actuated for a duration measured in milliseconds. If the erection cylinder shaft is actuated too soon or too late, it will elevate flights positioned beneath a carton, thereby throwing the carton into the air off the conveyor. Consequently, the control circuitry illustrated in FIG. 16 was devised to control the erection sequence. It employs the combination of the photoelectric sensing means 120, 122 and the vane switches 126 and 128 to exactly time the erections. The sequence of events to actuate the solenoid valve 120 controlling air pressure to cylinder 116 is:

(1) The photoelectric sensor must be exposed to light (space between cartons) to charge a capacitor;
(2) The photoelectric sensor must be exposed to dark (carton between source and sensor);
(3) One vane switch starts the circuit;
(4) The other vane switch stops the circuit.

After actuation of cylinder 116, it is reversed by reversal of solenoid valve 120 when the vane switch causes a "stop" condition. The circuit inherently causes steps 3 and 4 to be ignored until steps 1 and 2 occur with passage of an article.

More specifically, referring to FIG. 16, the A.C. input to leads 300 and 302 is rectified and filtered to the common conductor leads 308 and 310 across the series circuit R4, start vane switch 126 contacts 304, and stop vane switch 128 contacts 306; also to the control relays CR1 and CR2; and to the photoelectric control 122 contacts 314 (closed when light shines onto the photo sensor, open when photo sensor is darkened), and contacts 316 (open when light shines onto photo sensor, closed when photo sensor is darkened).

When a carton passes by the photo sensor, the cessation of the light causes opening of relay contacts 314 which disconnects the capacitor C3 from the charging path 308 through R7. The cessation of light also closes contacts 316 (314 opens before 316 closes) which disconnects C3 to wire 324. The charge on C3 is now held until relay CR1 is de-energized by vane switch 128 (contacts 306). When CR1 is de-energized contacts of CR1 connect capacitor C2 to capacitor C3 allowing C3 to charge C2. When contacts 304 (vane start switch 126) energize CR1, the transfer contacts CR1 remove C2 from wire 324 and connect it to ignitor grid of gas tube V1. The charged capacitor C2 causes the tube to conduct to energize relay CR2. (The path to positive voltage line 308 is completed by the closed relay contacts of CR1. Once started, the gas tube continues to conduct until the circuit is broken by CR1 contacts in line 308). Relay CR2 connects air solenoid 342 to 308, to extend trip bar 114. Relay CR2 also connects D1 and D2 to line 310 to completely discharge C2 and C3. The next closure of vane stop switch 128 contacts 306 de-energizes CR1, which is turn disconnects relay CR2 from supply line 308. When CR2 is de-energized the discharge path of C2 and C3 is removed and air solenoid 342 is de-energized permitting trip bar 114 to retract. This completes the cycle. The circuit is then ready to repeat as previously described.

It has been found that this unique combination of components achieves extremely accurate timing control of the flight erection system. Sensing of a carton by the electric eye system therefore "prepares" the switching circuitry in the control box 129. The rotation of the vane is so timed, and the second switch 128 is so positioned to throw the solenoid valve in the opposite direction an exact time interval later, when the vane 90° ahead of the vane that activated switch 126 passes through the second vane operated switch 128. Thus, rod 114 is extended only for the interval of passage of one individual flight 98 (fractions of a second), to elevate the flight to the position illustrated by the single erected flight in FIG. 5. This flight then forms a carton stop and slow down regulator in front of the particular carton which activates the electric eye sensor.

Figure 8:
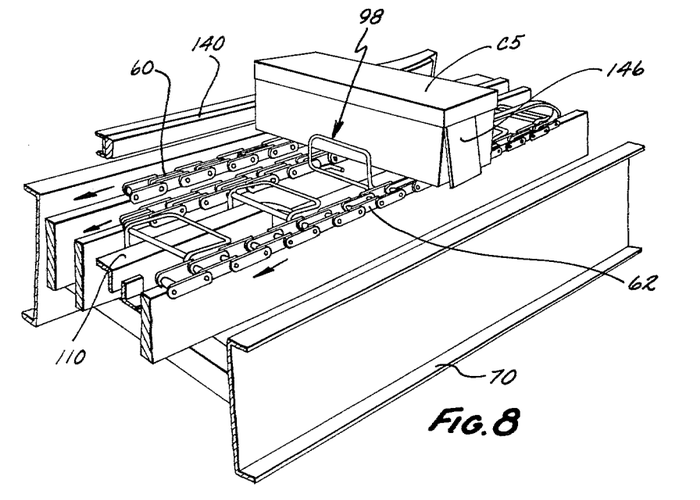
FIG. 8 is an enlarged fragmentary perspective view of a carton shown propelled against an elevated flight of the flight conveyor.

The flight conveyor moves at a speed considerably less than the chain speed of the high speed conveyor 18. Consequently, the carton is rapidly moved by the high speed conveyor into abutting position against the back of the flight on the front side of the carton, and maintains the carton in this relationship as illustrated in FIG. 8 by carton C5. This, therefore, accurately spaces the cartons at a multiple spacing of the flights, and also aligns the boxes to place their ends parallel to the conveyor. Utilizing this novel combination, the cartons can be rapidly conveyed a considerable distance while maintaining them in exactly controlled positions.

Not only is it necessary to space the cartons in controlled relationship, but their lateral position, especially the edge on one side of the conveyor on which the carton analyzing apparatus 26 is located, must be exactly controlled. This is achieved by utilizing the guide bars 24 on opposite sides of the conveyor.

Figure 10:
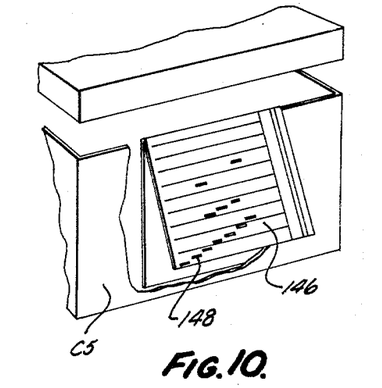
FIG. 10 is an enlarged fragmentary perspective view of an end of a shoe carton with a control data card in place thereon.
Figure 11:
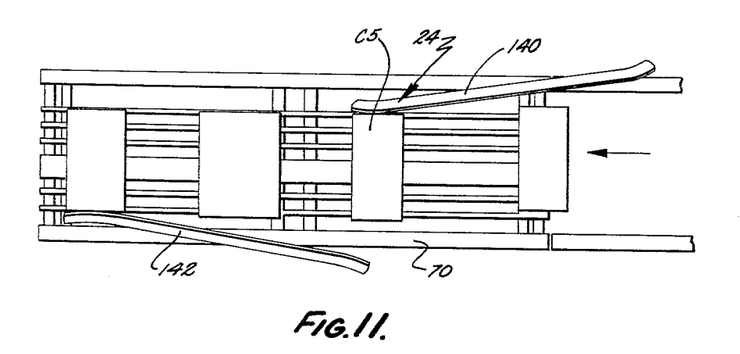
FIG. 11 is a plan fragmentary view of the carton lateral positioning guides adjacent the conveyor.

The first bar 140 is mounted on the side of the conveyor opposite the analyzing and control mechanism 26 and protrudes out over the conveyor in diagonal fashion. It pushes the cartons toward the opposite side of the conveyor (FIG. 5). This relationship is shown accurately in FIG. 11 as acting on cartons C5. The conveyor mechanism then continues to convey the cartons along until they contact the second guide flange 142 on the opposite side of the conveyor and slightly downstream. This bar pushes the carton back to exactly align the controlling end of the carton, on which the control card is mounted, with the card analyzer. The first positioning bar is therefore merely a feeder for the second bar, which actually determines the lateral position of the cartons. The data card 146 (FIG. 10) mounted on this end of the carton has coded orifices 148. These are punched into the card when it is mounted to the box before storage in the warehouse. The card (146) identifies the style, size and color of the shoes in the carton by the location or pattern of the orifices. It may be attached to the carton by folding it over the edge of an end, stapling it, and placing the cover down upon it (FIG. 10).

Figure 12:
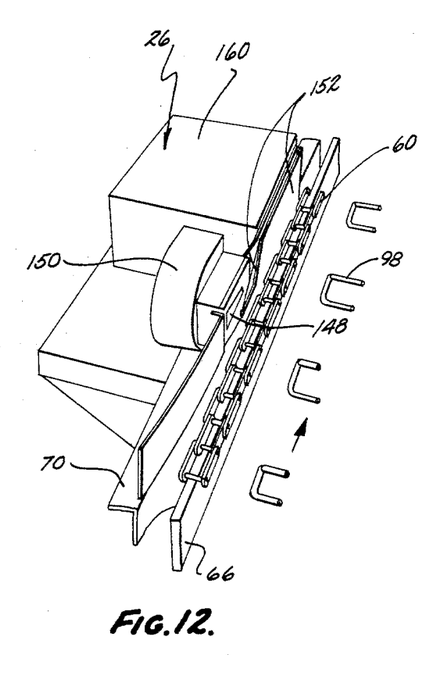
FIG. 12 is a fragmentary perspective view of a portion of the conveyor and the data card analyzer and carton discharge controller adjacent the conveyor.

Guide 142 (FIG. 11) orients the carton to cause the card to move adjacent the suction opening 148 (FIG. 12) of a centrifugal blower 150. This causes the card to engage and pass within an elongated slot 152 as the carton is conveyed. The card thus passes into operative association with analyzing and control unit 160. This control unit is a computer which is previously programmed with the specific orders to be picked and sorted. Thus, it contains a master of the card orifice patterns that belong to each order. It compares the card of each carton with its master, and electrically pre-sets the discharge mechanism to transfer the carton to a bay pre-selected to receive the cartons for the particular order. The detailed electrical circuitry actually is not unique to this invention and is conventionally used in electronically operated sorting mechanism of other types. An electrical pulse generator is located on the drive shaft of the timing conveyor to be actuated with rotation of the shaft. It provides an electrical feed back to the computers for every increment of travel of predetermined length, of the timing conveyor chain. The computer actuates the proper diverter after a predetermined number of electrical pulses have been generated by the pulse generator after the article started along the timing conveyor. The proper discharge cylinder 32 operates after this controlled interval for the carton to reach the selected cylinder. This computer controller is a conventional electronic signal-comparator type, manufactured for example by General Electric. The system, may also conceivably be an electromechanical, or a mechanical system to achieve the controlled discharge according to movement of the timing conveyor.

Figure 14:
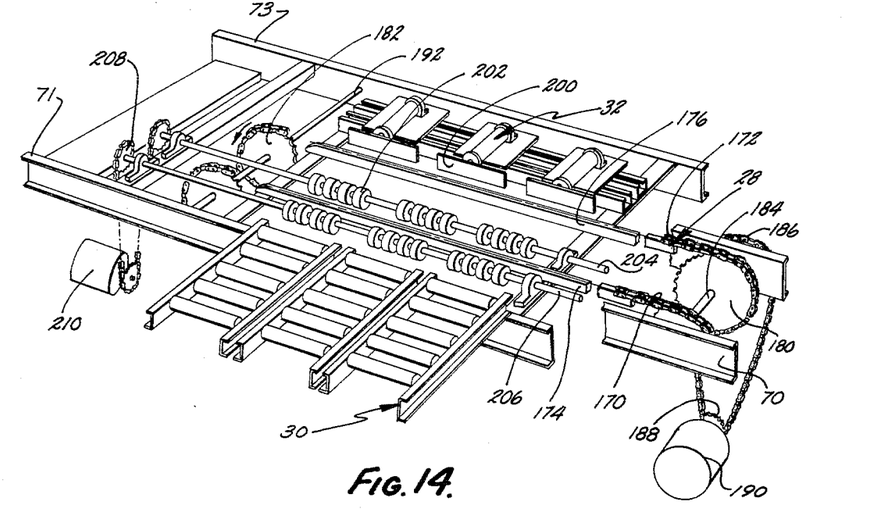
FIG. 14 is an enlarged perspective fragmentary view of the end portion of the timing conveyor and a plurality of receiving discharge bays.

In the illustrated form of the invention, especially FIG. 14, three of the discharge cylinders 32 are illustrated opposite three discharge bay roller conveyors 30. (In FIGS. 1 and 2, six of these are illustrated.) It should be realized that a large number of these bays may be employed, depending on the size of the warehouse involved and the number of orders to normally be picked simultaneously.

Sometimes, it may also be necessary to set aside two or more bays for one order. All of this is electrically controlled through the analyzer and computer 160 shown in box form. The delay caused during carton movement from the analyzer to the proper bay is controlled utilizing timing conveyor 28, which is actually a controlled distance discharge conveyor. It begins adjacent analyzer 126 and moves the remaining length of the conveyor apparatus. This conveyor includes a pair of roller chains 170 and 172 which travel on a pair of guide supports 174 and 176 as the chains move in endless fashion around pairs of sprockets 180 and 182 on opposite ends. These sprockets are mounted on suitable shafts. Either pair may be powered, with the other pair being idlers. Here, sprockets 180 are shown mounted on shaft 184, which also includes an additional sprocket and chain 186 driven by sprocket 188 from motor 190. The idler sprockets 182 are mounted on a shaft 192 between the side rails 71 and 73.

The carton discharge cylinders 32 are actuated by air pressure, controlled through solenoid valve means (not shown) which is electrically activated by analyzer 126 after a predetermined number of electric pulses have been emitted by the pulse generator. The period expires after the chain moves a certain number of links, i.e. a certain distance, down the conveyor. The rate of movement of the chain is exactly controlled. Extension of a discharge cylinder 32 shifts its bumper plate 200 on the shaft of the cylinder to push the adjacent carton transversely off the conveyor. To assist in this transverse movement, a plurality of roller wheels 202 mounted on shafts 204 and 206 are rotated transversely to the normal direction of the conveyor. The shafts are driven by sprockets 208 on the ends thereof, utilizing an electrical drive motor 210. Each carton is discharged onto the rollers of the storage order conveyor 30, to be later loaded into trucks or other vehicles. Each of the discharge cylinders 32 may be adjustably positioned with respect to its discharge bay by sliding it along its parallel mounting tracks 220.

In operation of the apparatus, as the cartons on a vertical conveyor 40 (FIG. 3) are shifted in front of the loading cylinder 42, the loading cylinder is actuated to extend shaft 46 and plate 44, pushing the cartons C onto belt 48 of conveyor 14. This conveyor rapidly shifts the cartons out of the way to accommodate the next pallet of cartons, and transfers them to the slower moving belt 50 of conveyor 16 where the articles remain temporarily grouped adjacent fashion (FIGS. 2 and 3). Belt 50 conveys the cartons as at C2 (FIG. 2) and transfers them onto chains 60 and 62 (FIG. 4) of high speed conveyor 18, after passing over roller 80 and wheels 82.

Due to the higher speed of conveyor 18, the cartons are spaced, i.e. singulated. The cartons are carried by the high speed conveyor even after the high speed conveyor overlaps the flight conveyor 20 (FIG. 5). The individual flights are initially in a depressed condition as illustrated. The arcuate bracket 99 adjacent the end of the flight conveyor prevents the individual flights from flying to a vertical position by centrifugal force as they are rapidly conveyed around the sprockets 94. The upper pass of the endless flight conveyor chain is beneath the cartons.

When a carton moves between the electric eye sensors (FIGS. 5 and 6) forming part of the control system 22 (FIG. 2), the vane switches 126 and 128 have their circuits pre-set, so that the movement of the next vane 125 through vane switch 126 causes the solenoid valve 120 to be activated. This allows air pressure to actuate cylinder 116, thereby extending flight erection rod 114 (FIG. 9) into the path of a depending leg 106 of one of the individual flights 98 (FIG. 9). This causes the flight to be pivoted on its mounting pins as it passes, and causes the dogleg 108 to move up over lip 111 and on top of angle guide 110, to maintain the flight erect. The high speed conveyor chains 60 and 62 push the carton against the elevated flight (FIG. 8) because the flight moves at a slower linear speed. All of the cartons are thus accurately spaced and aligned, with their control cards 146 (FIG. 10) oriented on the side of the conveyor on which the analyzer 26 (FIGS. 2 and 12) is located.

The cartons are then shifted transversely by the first diagonal guide flange 140 of guide means 24 (FIG. 11, FIG. 5, FIG. 8 and FIGS. 1 and 2) to push the cartons toward the second aligning guide. Subsequently, the end of the cartons on which the data card 146 is found contacts the second diagonal flange 142 (FIG. 11), which shifts this end of the carton to an exact aligned position with respect to receiving slot 152 (FIG. 12) of the analyzer mechanism. The conveyor moves the carton adjacent the analyzer, at which time the card is sucked against opening 148 by blower 150, to assure card movement through slot 152.

Figure 15:
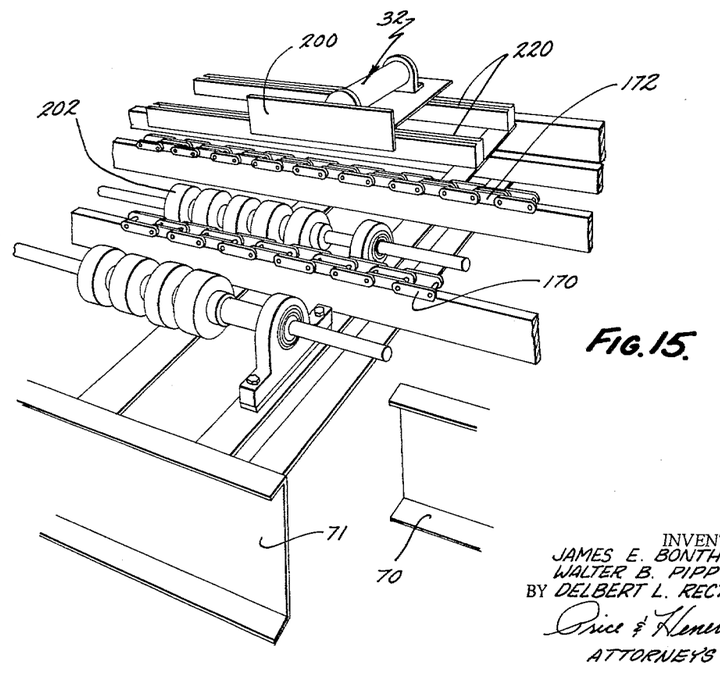
FIG. 15 is an enlarged perspective view of one of the discharge cylinders opposite one discharge bay.

The card orifice pattern is then analyzed by analyzer 26 in accordance with the master pattern programmed into the device. The analyzer-controller then pre-sets circuitry to cause a delayed actuation of a selected discharge cylinder after a controlled time period determined by the amount of movement of the timing conveyor and thus the number of pulses generated. The carton may have corresponding data printed on the card by the controller if desired. The carton is then moved onto the timing conveyor chains 170 and 172 which move at a controlled rate of linear speed (FIGS. 13, 14 and 15).

After a predetermined distance down the pulse-controlled conveyor, the pre-set circuit activates a solenoid valve or the equivalent (not shown) which then actuates the discharge cylinder 32 on a selective bay to shift a particular carton transversely off the main conveyor, across the roller wheels 202 onto one of the roller bay conveyors 30, to cause the cartons of that particular order to all be placed on a selected discharge bay. The cartons are then ready to be loaded onto a vehicle for transportation to the retailer.

It will be obvious that by using this novel conveyor apparatus, several orders can be simultaneously, efficiently picked by individuals in the warehouse, placed in mixed fashion on the conveyor apparatus, and still end up in sorted orders on selected bays. If desired, the computer can also determine whether all of the cartons in a particular order have passed or not. However, this does not form part of this invention.

As a result of the advantages of this mechanism, large warehousing operations can achieve greater flexibility and much greater efficiency of time usage while far less manual labor to achieve the same operations. Various additional advantages will readily occur to those in the art upon reviewing the foregoing form of the invention illustrated. Also, various minor modifications or structural equivalent components may be substuted to achieve the purposes taught in the manner taught within the concepts and principles taught. These obvious modifications are therefore deemed to be part of this invention.

We claim:
1. Conveyor apparatus capable of spacing articles thereon, comprising: conveyor means having a plurality of spaced shiftable flights capable of being shiftably pre-conditioned for protruding upwardly therefrom at selected intervals when pre-conditioned, and moving with said conveyor means; article propulsion means generally coextensive with said conveyor means, and moving at a faster rate of travel than said conveyor means and said flights; said flights, when protruding upwardly, being in the path of articles propelled by said article propulsion means, to cause said article propulsion means to propel individual articles against said flights and thereby space the articles at controlled intervals; and pre-conditioning means cooperative with said flights on an individual basis to selectively condition certain flights according to article flow; said preconditioning means including a flight shifter responsive to the passage of an article to shift a selected flight into the path of said article.

2. The apparatus in claim 1 wherein said shifter is responsive to a combination signal from a photosensitive timing circuit pre-setter and a timing switch.

3. Article spacing conveyor apparatus comprising: a feed conveyor means transferring articles in close relationship; a high speed conveyor adjacent said feed conveyor and having a substantial portion co-extensive with a flight conveyor; said flight conveyor having a series of individual, spaced flights moving as part of the flight conveyor and movable from a depressed condition out of the path of articles to a raised condition above said high speed conveyor and in the path of articles; said high speed conveyor causing random spacing of articles received from said batch conveyor, and propelling each of said articles against a raised flight on said flight conveyor; and controlled flight elevating means to raise individual flights in response to the presence of an article on said flight conveyor.

4. In a carton routing conveyor apparatus, comprising: carton feed conveyor to transport cartons each having a routing card on one end; a high speed singulating conveyor receiving cartons from said feed conveyor, and moving at a faster rate than said feed conveyor to singulate said cartons; said singulating conveyor including a pair of spaced endless elements supporting the ends of the cartons; a flight conveyor coextensive with a substantial portion of said singulating conveyor, and positioned between said spaced elements; the improvement comprising said flight conveyor including a pair of spaced endless drive elements having a plurality of erectable flights supported therebetween and moving therewith; said flights, when depressed, being out of the path of cartons on said singulating conveyor, and when erected, being in the path of the cartons; said flights moving at a speed less than said singulating conveyor to cause individual cartons to be propelled against said flights for controllable spacing of the cartons; shiftable flight erection means along said flight conveyor to intercept individual depressed flights when activated; carton sensing and controlled timing mean operably associated with said erection means to shift it for erection of a selected flight and retract it again after a controlled time interval.

References Cited by the Examiner

UNITED STATES PATENTS

| | | | |
|---|---|---|---|
| 1,915,765 | 6/1933 | Sharkey | 198—170 |
| 2,171,362 | 8/1939 | Gulliksen | 198—34 |
| 2,816,647 | 12/1957 | Ruth | 198—34 |
| 2,840,224 | 6/1958 | Lefief | 198—34 |
| 3,019,883 | 2/1962 | Jones | 198—38 |
| 3,034,634 | 5/1962 | Brand et al. | 198—38 |
| 3,084,490 | 4/1963 | Bogdanski et al. | 198—170 XR |

EVON C. BLUNK, *Primary Examiner.*

SAMUEL F. COLEMAN, *Examiner.*

R. J. HICKEY, *Assistant Examiner.*